June 27, 1972
P. T. TRIOLO ET AL
3,672,806
DIE ASSEMBLY
Filed July 22, 1970
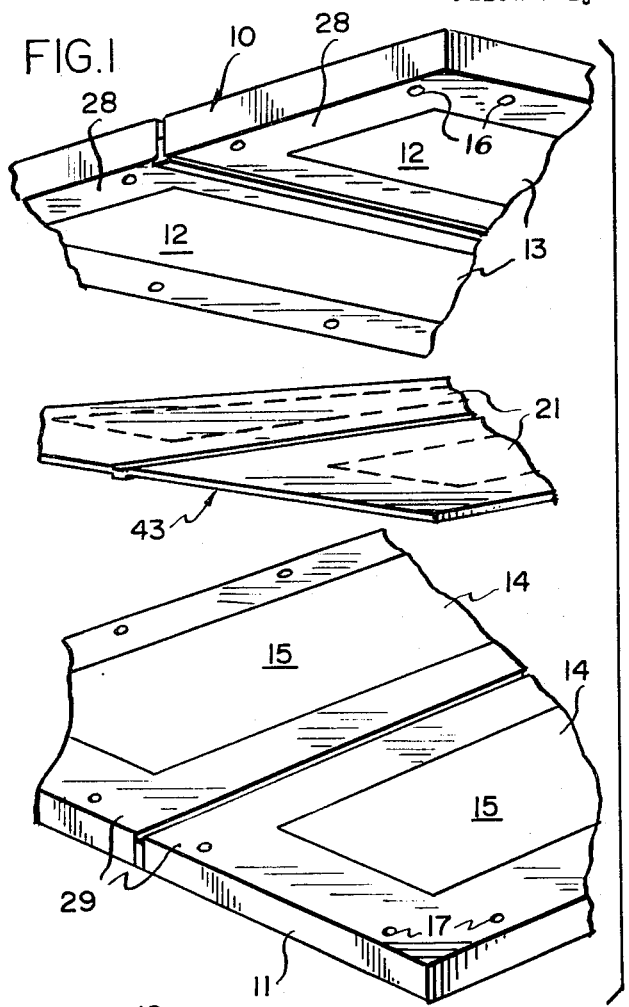
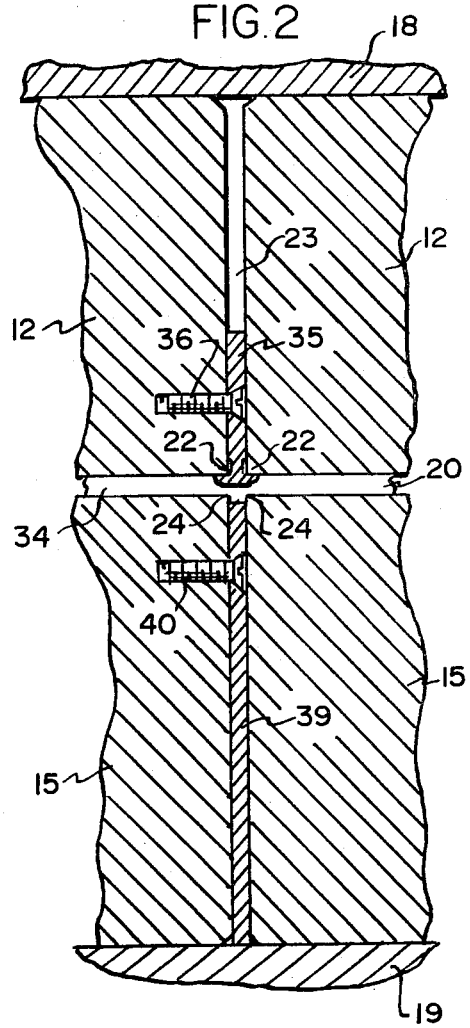
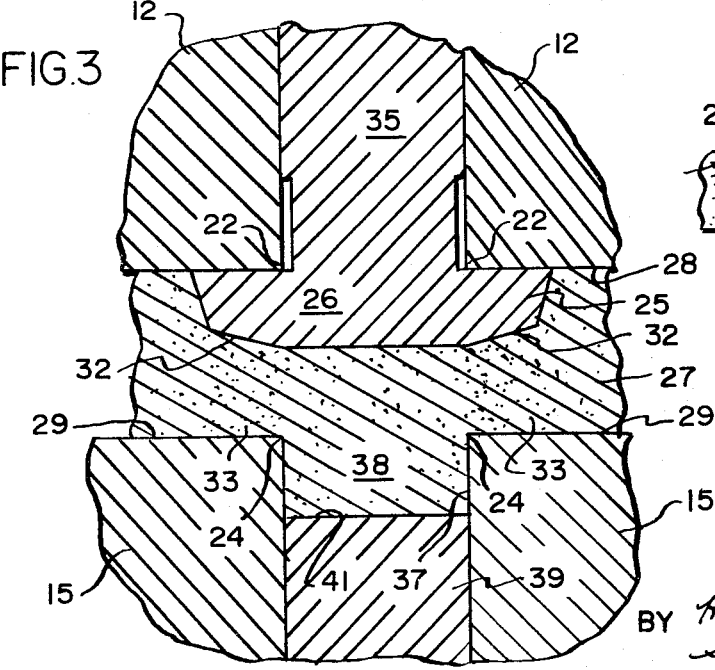
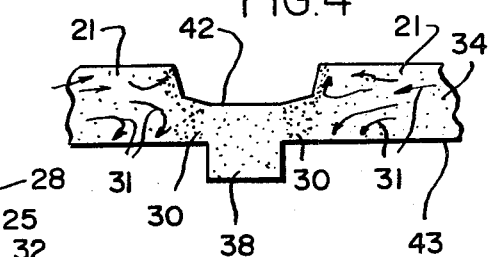
INVENTORS.
PETER T. TRIOLO
HARLAN H. SCHUTTE
BY Hofgren, Wegner, Allen,
Stellman & McCord.
ATTORNEYS.

United States Patent Office 3,672,806
Patented June 27, 1972

3,672,806
DIE ASSEMBLY
Peter T. Triolo and Harlan H. Schutte, Dubuque, Iowa,
assignors to Scovill Manufacturing Company
Filed July 22, 1970, Ser. No. 57,096
Int. Cl. B29c 17/00
U.S. Cl. 425—406
7 Claims

ABSTRACT OF THE DISCLOSURE

A die assembly for forming and shaping articles from a moldable material by heat compressing the material between a pair of dies in which the dies comprise adjacent die units in side-by-side relationship to form a plurality of molded articles simultaneously and having a compressing member on one of the dies at the edges of the units and spanning these edges to increase the density of the molded material at these edges. This compressing member not only densifies the edges of the article but also restricts and thereby controls the rate of escape of volatile products from the moldable material that would ordinarily tend to rupture and weaken the molded product at the edges if the edges were not thusly densified.

BACKGROUND OF THE INVENTION

The invention is concerned with a die assembly for forming articles from a moldable material. It is particularly concerned with a die assembly for shaping a moldable material that tends to give off volatile gases during the molding operation with these gases normally tending to weaken the molded product at the edges because of their forcing passages through the material during the molding in escaping from between the dies. The invention is especially concerned with such an assembly for molding a fiber containing material as the gases tend to form passages through and along the fibers.

The invention successfully overcomes the above problem by providing a barrier in the form of a compressing member at the edges of the die units that produce the shaped molded articles with this compressing member providing a controlled escape of the volatile materials.

SUMMARY OF THE INVENTION

The die assembly of this invention is for forming articles from a moldable material by providing a pair of dies having spaced shaping surfaces between which the material is molded with at least one of these dies comprising adjacent die units with adjacent edges to provide adjacent molded articles in the molding step together with a compressing member spanning the adjacent edges of the die units and having a thickness extending partially across the space between the shaping surfaces of the dies to densify the molded materials of the adjacent articles at these edges and further to permit only controlled escape of volatiles from the materials during the molding so that the adjacent edges will not be overly soft and fragile resulting either in edge defects to the resulting molded article or requiring excessive removal of overly soft edge portions of the article.

In a preferred structure the other die that is opposite the one die that comprises the adjacent die units with the compressing members is provided with means forming a receiving cavity directly opposite the compressing member into which the moldable material flows under the urging of the compressing member.

In a preferred structure the means forming a receiving cavity in this other die comprise spacer members between adjacent die units in this other die with each spacer member having an edge recessed from the corresponding shaping surfaces of their other die units so an to present a cavity to the compressing member into which the moldflow.

BRIEF DESCRIPTION OF THE DRAWINGS

FIG. 1 is a fragmentary exploded perspective view of a pair of dies embodying the invention with a molded article therebetween.

FIG. 2 is a fragmentary sectional view through the pair of dies of FIG. 1 in molding position and with pressure being applied thereto by the platens of a customary press.

FIG. 3 is an enlarged detail sectional view of FIG. 2.

FIG. 4 is a fragmentary sectional view through the joint formed between adjacent molded articles produced with the die assembly of this invention and illustrating the flow paths of released volatile gases and the density gradient at the adjacent edges of the adjacent molded articles.

DESCRIPTION OF THE PREFERRED EMBODIMENTS

As shown in the accompanying drawings the die assembly of this invention comprises a pair of cooperating dies including an upper die 10 and a lower die 11 that have shaping surfaces between which the moldable material is molded.

In the illustrated embodiment the shaping surfaces in the upper die 10 is provided by adjacent die units 12 that have raised areas 13 that cooperate with recessed areas 14 in similar die units 15 in the lower die 11. These adjacent die units 12 in the upper die 10 and 15 in the lower die 11 are secured in position by the customary bolts 16 and 17 to ordinary platens 18 and 19 of a conventional press used to apply heat and pressure to the dies and thus the moldable material 20 therebetween.

As can be seen from the above description and from the drawings, the shaping surfaces 13 and 14 of the pair of dies are provided by the adjacent die units 12 and 15 so as to produce simultaneously a plurality of adjacent molded articles as illustrated at 21 in FIG. 1. As is shown most clearly in FIGS. 2 and 3 the adjacent die units 12 have adjacent edges 22 that are spaced apart by the spacing 23 between the die units 12. The lower die units 15 have similar spaced edges 24 that are directly opposite the edges 22 in the illustrated embodiment.

The die assembly also includes a compressing member 25 made of a very hard material such as hardened steel with this compressing member 25 spanning the adjacent edges 22 of the one die 10 units 12 with this compressing member having a thickness 26 extending partially across the space 27 between the shaping surfaces 28 and 29 of the dies. This compressing member 25 by partially spanning the distance between the dies makes the molded articles 21 of increased density in the portions adjacent the compressing member 25. In other words, the compressing member serves to densify the molded material of the articles at the adjacent edges 30 of the articles 21. This result is illustrated in FIG. 4 where heavier shading is used at these edges to denote increased density.

In the illustrated embodiment the die assembly illustrated is for producing a plurality of molded door panels simultaneously from a fibrous containing moldable material 20 that contains short length wood fibers and a resin binder of which a customary urea-formaldehyde resin is preferred. Such molding compositions of course give off volatile gases and the structure of this invention provides a partial dam or restraint to the escape of these gases which tend to flow as indicated by the arrows 31 in FIG. 4. Thus the die assembly of this invention is particularly important in molding moldable materials that give off volatile gases during the molding step and is particularly effective with such moldable materials that also contain fibers whose adjacent fiber structures in the material tend to establish raceways for the escaping gases.

The escaping gases at the edges of adjacent die units during attempts to mold several articles simultaneously were therefore not successful without the compressing member dams because the escaping high velocity gases during the molding and curing cycle broke up the fibers so that the resulting adjacent molded articles had weakened edges. Furthermore, the latter machining and cutting operations that were required by these weak edges required too much removal of edge material.

By using the compressing member dam of this invention the density of the edges is easily controlled and the escaping gases 31 are restrained in their escape so as to prevent undue weakening and rupture of the edges. This problem is not encountered at the areas of the dies spaced inwardly of the edges as here the volatile action is controlled by the pressure of the dies themselves and the escape paths that would be necessary are so long that escape rupturing of the material is not encountered.

In the embodiment disclosed the lateral edges of the compressing member 25 are beveled as shown most clearly in FIG. 3 and compress the material 33 opposite these edges 32 approximately at least 25% more and preferably about 25-75% or greater than the density of the remainder of the article as indicated at 34. As is shown in the specific embodiment these edges 32 of the member 25 extend somewhat less than one-half the thickness between the surfaces 28 and 29. As can be seen both from FIG. 3 and FIG. 4 the member 25 therefore decreases drastically the rate of escape of volatile gases 31 and provides a more uniform and higher density edge to the resulting molded articles.

In the structure illustrated the compressing member 25 comprises the cross bar of a T whose vertical leg 35 is located between the adjacent die units 12 and is held therein by spaced bolts 36 so that this vertical leg 35 also serves as a spacer between the adjacent die units 12.

In the preferred structure as illustrated the opposite die units 15 are spaced apart at their edges 24 to provide a receiving cavity 37 opposite the compressing member 25 into which moldable material flows under the urging of the compressing member as indicated at 38. This cavity therefore relieves the pressure required to form the densified edge areas 33 in the molded product.

In the illustrated embodiment this cavity 37 is provided by a spacer bar 39 held in position between the adjacent die units 15 by spaced bolts 40 with the edge 41 of this bar 39 being recessed below the shaping surfaces 29 to provide the cavity.

As can be seen in FIG. 4, the member 25 produces an elongated cavity 42 in the molded product 43 which functions as an indentation aiding in the breaking apart of the plurality of molded articles 21.

Having described our invention as related to the embodiment shown in the accompanying drawings, it is our intention that the invention be not limited by any of the details of description, unless otherwise specified, but rather be construed broadly within its spirit and scope as set out in the appended claims.

We claim:

1. A die assembly for forming articles from a moldable material, comprising: a pair of dies having spaced shaping surfaces between which said material is molded, one of said dies comprising adjacent die units, with adjacent elongated edges, to form adjacent molded articles; and a compressing member spanning said adjacent edges for substantially the entire length thereof having a thickness extending only partially across the space between said surfaces for said entire length to densify the molded material of the articles at said adjacent edges.

2. The assembly of claim 1 wherein the other of said pair of dies is provided with means forming a receiving cavity opposite said compressing member into which said material flows under the urging of said compressing member.

3. The assembly of claim 1 wherein the sides of said compressing member within said space have beveled surfaces.

4. A die assembly for forming articles from a moldable material, comprising: a pair of dies having spaced shaping surfaces between which said material is molded, one of said dies comprising adjacent die units, with adjacent edges, to form adjacent molded articles; and a compressing member spanning said adjacent edges having a thickness extending partially across the space between said surfaces to densify the molded material of the articles at said adjacent edges, said compressing member comprising the cross-member of a T bar whose vertical base comprises a strip located between adjacent die units.

5. The assembly of claim 2 wherein said other of said pair of dies comprises adjacent die units and said means forming said receiving cavity comprises a spacer member between said units having an edge recessed from the corresponding said shaping surfaces.

6. A die assembly for heat and pressure molding of a moldable material that evolves volatile gases during heating, comprising: a pair of dies each comprising adjacent die units with adjacent edges, and having shaping surfaces between which said material is molded to form adjacent articles; a compressing member spanning said adjacent edges of said one die having a thickness extending partially across the space between said surfaces to densify the molded material of the articles at said adjacent edges, said compressing member comprises the cross-member of a T bar whose vertical base comprises a strip located between adjacent die units; and a spacer member separating the adjacent die units of the other die having an edge recessed from the corresponding said shaping surface thereby comprising means forming a receiving cavity opposite said compressing member into which said material flows under the urging of said compressing member.

7. The assembly of claim 6 wherein the sides of said compressing member within said space have beveled surfaces.

References Cited

UNITED STATES PATENTS

| | | | |
|---|---|---|---|
| 3,518,334 | 6/1970 | Carrigan et al. | 18—19 RX |
| 1,932,548 | 10/1933 | Ingwer | 18—42 R UX |
| 2,687,157 | 8/1954 | Cowan | 18 Dig. 3 |

ROBERT L. SPICER, JR., Primary Examiner